Dec. 21, 1937.　　　　W. J. MORRILL　　　　2,103,166
COMMUTATING TYPE ARMATURE
Filed Dec. 11, 1936
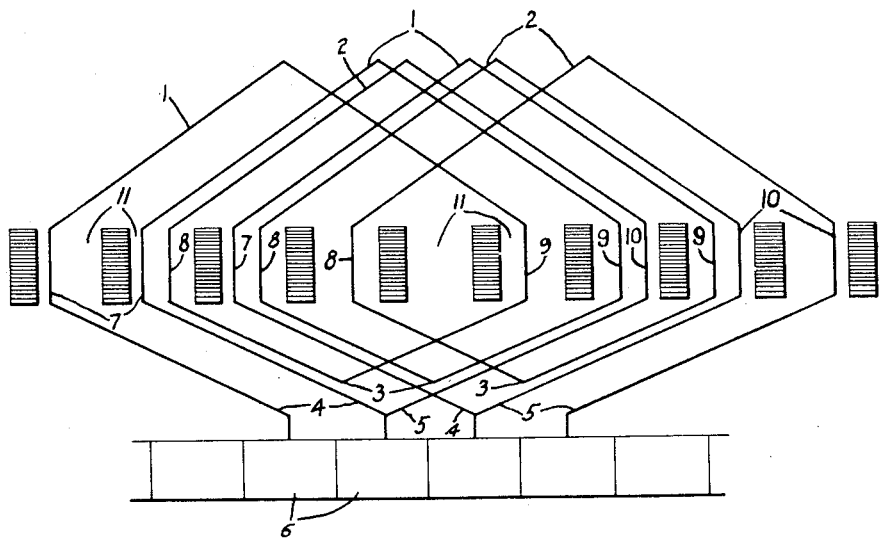
Inventor:
Wayne J. Morrill,
by Harry E. Dunham
His Attorney.

Patented Dec. 21, 1937

2,103,166

UNITED STATES PATENT OFFICE 2,103,166

COMMUTATING TYPE ARMATURE

Wayne J. Morrill, Fort Wayne, Ind., assignor to General Electric Company, a corporation of New York Application December 11, 1936, Serial No. 115,372

3 Claims. (Cl. 171—206)

This invention relates to dynamo-electric machines, and more particularly to armature windings for commutating type machines.

An object of my invention is to improve the commutation of such machines by providing them with a special type of winding. I accomplish this by dividing each winding element of the winding of the rotatable member of the machine into a number of sections arranged in adjacent slots and connected in series between adjacent commutator segments.

Further objects and advantages of my invention will become apparent, and my invention will be better understood from the following description referring to the accompanying drawing, and the features of novelty which characterize my invention will be pointed out with particularity in the claims annexed to and forming a part of this specification.

For a better understanding of my invention, reference is made to the accompanying drawing which represents a partial diagrammatic development of an armature of a dynamo-electric machine having a lap winding embodying my invention.

In the drawing, an armature winding is shown having a plurality of winding elements, each comprising two coils or sections, 1 and 2, each of which extends over a full coil pitch for the particular machine; however, these coil sections also could each be fractional pitch coils. These two coils are shown connected in series at 3, and these two series-connected coils are connected at 4 and 5 to adjacent commutator bars 6. Corresponding coil sides 7 and 8, and 9 and 10, of each coil 1 and 2, respectively, of each winding element, are arranged in adjacent slots 11 of a slotted core, and a coil side of a different coil of adjacent winding elements is arranged in each slot of the core. By this arrangement, the self-induction of each winding element is lessened by its subdivision into adjacent slots, and the mutual induction between adjacent winding elements is increased because of the presence in a single slot of coil sides of adjacent winding elements. In this manner, the energy of the winding element undergoing commutation is partly transferred to the next adjacent winding element by its mutual induction therewith, and consequently the commutated current of the commutated winding element is correspondingly decreased and commutation is improved.

While I have illustrated and described my invention as applicable to a lap winding, it is apparent that it may also be used in machines provided with wave windings. Modifications of my invention will occur to those skilled in the art, and I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A rotatable member for a dynamo-electric machine having a slotted core and a commutator, a winding including a plurality of winding elements, each of said winding elements being formed of a plurality of coils extending over a normal coil pitch and connected in series, corresponding coil sides of each of said coils of each of said winding elements being arranged in adjacent slots of said core, and each of said slots of said core having a coil side of a different coil of adjacent winding elements of said winding.

2. A rotatable member for a dynamo-electric machine having a slotted core and a commutator, a winding including a plurality of winding elements, each of said winding elements being formed of two coils extending over a normal coil pitch and connected in series, corresponding coil sides of each of said coils of each of said winding elements being arranged in adjacent slots of said core, and each of said slots of said core having a coil side of a different coil of adjacent winding elements of said winding.

3. A rotatable member for a dynamo-electric machine having a slotted core, a commutator, a winding formed of a plurality of winding elements connected to adjacent commutator segments of said commutator, each of said winding elements being formed of two coils connected in series and arranged in adjacent slots of said core, and each slot being provided with at least one coil side of two adjacent winding elements of said winding.

WAYNE J. MORRILL.